Figure 1:
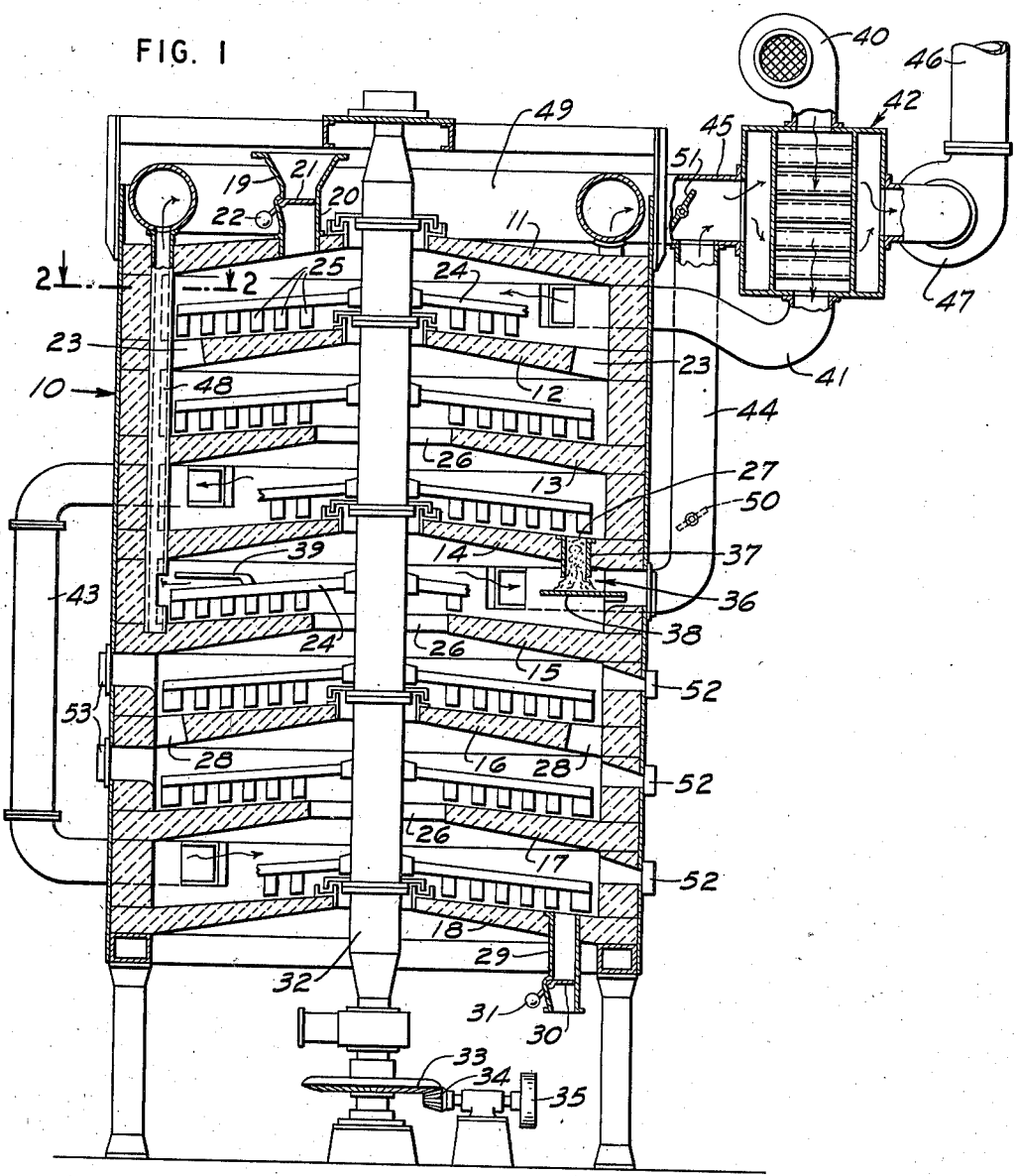

INVENTOR
WILLIAM RAISCH
BY Louis L. Ansart
his ATTORNEY

Patented Aug. 2, 1938

2,125,737

UNITED STATES PATENT OFFICE 2,125,737

INCINERATION

William Raisch, New York, N. Y., assignor to Underpinning & Foundation Co., Inc., New York, N. Y., a corporation of New York Application November 7, 1936, Serial No. 109,617

7 Claims. (Cl. 110—12)

The present invention relates to incineration and more particularly to improvements in apparatus of the multiple-hearth type of furnace providing one or more preliminary or drying stages in which moisture and volatile constituents are driven off from the material to be treated as by subjecting the material to heat and contact with a stream of air, preferably preheated, and one or more stages in which the dried material is completely burned.

While applicable to the treatment of various materials, the present invention is particularly adapted for the disposal and destruction of waste materials, such as garbage and sewage solids in the form of sludge or in the form of screenings having high moisture content.

The principal objects of the invention are to provide novel, advantageous and efficient forms of apparatus for effecting treatment of the general character specified. Another object of the invention is to provide, in connection with a multiple hearth furnace divided into two sections, a drying section and a burning section, means for heating the interior of the drying section by passing the hot combustion gases from the lower burning section upwardly in heat exchanging relationship with said interior. A further object is to provide apparatus in which the hot combustion gases may be passed upwardly in heat engaging relationship with the interior of the drying section and then to the outside of the furnace, or may be by-passed directly from the burning section to the outside of the apparatus.

In carrying out the invention, use may be made of a vertical furnace of the tiered multiple-hearth type comprising vertically spaced hearths separating the furnace into compartments or zones and provided with outlet at the center of one hearth and the periphery of the next adjoining hearth either above or below, the lowermost hearth preferably having a peripheral outlet through which the ash may be discharged from the furnace. The furnace may also be divided into an upper drying section and a lower burning section by providing a gas seal at one of the hearths to prevent air or gases from passing therethrough in either direction. Air preheated by being brought into heat exchanging relation with the hot exhaust gases from the burning section is supplied to the drying section and passed downwardly therethrough and then conducted to the lower part of the burning section.

From the upper part of the burning section the hot gases may be passed upwardly through heat interchange ducts or tubes at the inner surface of the peripheral wall of the furnace so as to heat the interior of the drying section. At their upper ends these tubes may communicate with a manifold which in turn is connected with a heat exchanger in the path of the combustion gases on their way through a suitable fan to a stack. This heat exchanger may serve to preheat the air supplied to the drying section. The uppermost compartment of the burning section may also be connected by means of a by-pass to the heat interchanger so as to discharge hot combustion gases therethrough to the stack. The ducts may be supplied with suitable means such as dampers so that the combustion gases from the burning section may be used either to heat the interior of the drying section or may be passed directly through the heat exchanger, thus tending to raise the temperature of the air supplied to the drying section. Burners may be used in connection with various compartments to enable the regulation of the temperature therein so that, for example, if noxious odors are produced by treatment in the drying section, the temperature in the burning section will be sufficient to eliminate such odors.

The aforesaid dampers may be controlled either manually or automatically in accordance with temperatures in the drying section to regulate the proportionate parts of the hot gases flowing through the heat-exchange ducts in the drying section and through the by-pass.

Figure 2:
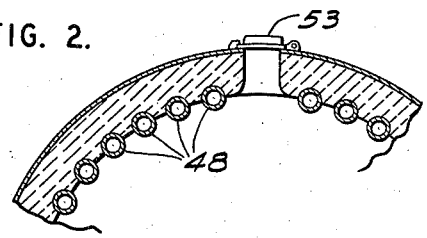

Other objects, features and advantages will appear upon consideration of the following description and of the drawing in which Fig. 1 is a vertical sectional view of a furnace embodying the present invention in a preferred form; and Fig. 2 is a section on the line 2—2 of Fig. 1.

Referring to the drawing, the invention may be embodied in a furnace 10, provided with a top 11, and hearths 12, 13, 14, 15, 16, 17 and 18 of which the hearth 18 serves as the bottom of the furnace or furnace chamber. The material to be treated may be introduced into the furnace and deposited upon the uppermost hearth 12 through a hopper 19 and a chute 20 extending through the top 11 of the furnace and provided with a pivoted door or gate 21 normally held closed by suitable means such as a weighted arm 22. As soon as a sufficient amount of material to overcome the action of the weighted arm 22 collects on the door or gate 21, the door swings downwardly about its pivotal support and permits the material thereon to fall to the hearth 12.

As illustrated, this material falls on the hearth 12 near its center and may be worked outwardly to peripheral discharge openings 23 by suitable rabbling means including one or more radial arms 24 and inclined blades 25. Below the hearth 12, the hearths 13, 15 and 17 are provided with central outlets 26, the hearth 14 is provided with a peripheral outlet 27, the hearth 16 is provided with peripheral outlets 28 and the lower hearth 18 is provided with a single peripheral outlet or chute 29 through which the ash is discharged from the furnace. The chute 29 may be provided with a gas seal in the form of a pivoted door 30 normally held in closed position by a weighted arm 31. The material on the hearths 13, 14, 15, 16, 17 and 18 may be moved towards the outlets of said hearths by suitable rabbling means similar to the rabbling means above the hearth 12, the blades 25 above the hearths 13, 15 and 17 being so inclined as to pass the material inwardly to the central outlets thereof, and the blades above the hearths 14, 16 and 18 being so inclined as to work the material towards the peripheral outlets as in the case of hearth 12.

The rabbling arms are supported and operated by a hollow vertical shaft 32 passing through the central portions of the central outlets 26 of the hearths 13, 15 and 17 and through small openings in the top 11 and the hearths 12, 14, 16 and 18, suitable gas seals being provided where the shaft 32 passes through the top and these last mentioned hearths. The shaft 32 may be rotated in any suitable manner, as by means of a bevel gear 33 thereon, a bevel gear 34 meshing with the bevel gear 33 and a pulley 35 connected with the bevel gear 31 and driven from any suitable source of power.

The hearth 14 may be used to divide the furnace into an upper drying section and a lower burning section. Although the hearth may have more than one outlet 27, it may be desirable to have only one outlet to render it more easy to effect a gas seal at this hearth. As illustrated use is made of a sweep valve 36 including a tube 37 in the outlet 27 and extending downwardly to a level slightly above a fixed shelf 38 on which the material piles up and maintains the tube 37 closed, and one or more sweep members 39 carried by rabble arms 24 in the compartment below the hearth 14. It will be evident that each time a sweep member or sweep 39 removes material from a shelf 38, the material in the corresponding tube or chute 37 settles without breaking the gas seal.

Air may be supplied to the drying section by means of a fan 40 and a duct 41 preferably discharging the air into the upper compartment of the drying section. The air supplied to the upper compartment of the drying section may also be preheated by means of a heat exchanger 42 associated with the duct 41. The preheated air is passed downwardly through the drying section to the lowermost compartment thereof and then, partially cooled and laden with vapor of moisture and of volatile materials, is passed through a duct or pipe 43 to the lower part of the burning section, preferably the lowermost compartment of the burning section. An updraft is maintained in the burning section and the air thus introduced acts to promote combustion. The temperatures in certain parts of the burning section are sufficiently high to eliminate any noxious odors which may have resulted from the drying of the material in the drying section.

The hot gases of combustion may be withdrawn from the upper part of the burning section, preferably from the uppermost compartment thereof in either of two ways. In one way they are withdrawn through a duct 44 communicating through a main duct 45 with the heat interchanger 42 and a stack 46, the draft being preferably induced by means of a suitable fan 47 through which the hot gases pass on their way from the heat exchanger 42 to the stack. In the second way of withdrawing the hot gases of combustion from the uppermost compartment of the burning section, the hot gases of combustion may be passed upwardly through ducts or pipes 48 at the inner surface of the peripheral wall of the furnace in the drying zone and discharged from these ducts 48 into a manifold 49 communicating with the duct 45 leading to the heat exchanger 42 and the stack 46. The ducts 48 serve as heat exchangers between the hot combustion gases passing therethrough and the interior of the drying section of the furnace. Obviously these ducts 48 must be of material of high heat resisting qualities and of substantial heat conducting quality.

In order to control the flow of hot gases through the duct 44 and the ducts 48, the duct 44 may be provided with a damper 50 and the duct 45 may be provided with a damper 51 between the manifold 49 and the connection between the duct 44 and the duct 45. By closing the damper 50 and opening the damper 51 all of the hot gases of combustion may be passed through the heat exchange tubes 48 and other connections to the heat exchanger 42 and the stack 46 and by closing the damper 51 and opening the damper 50 the hot gases of combustion may be by-passed around the tubes 48 and the manifold 49 and passed directly to the heat exchanger 42 and the stack 46. In the first case a greater amount of heat will be supplied directly to the interior of the drying section and a lesser amount through the heat exchanger 42 to the air passing through the duct 41. In the second case there will be susbtantially no heating of the interior of the drying section from the ducts 48 and the air passing through the duct 41 to the upper part of the drying section will be heated to a greater extent. By varying the opening of the dampers 50 and 51, the relative amounts of heat supplied through the heat exchange ducts 48 and through the heat exchanger 42 may be varied. The dampers may be controlled manually or automatically by means including a pyrometer in the drying section.

In order to aid in starting the furnace, and to assure sufficiently high temperatures in the various parts of the burning sections, the burning section may be supplied at suitable points with burners 52. Access to the interior of the furnace may be had through suitably positioned doors 53.

In starting the furnace, the rabbling mechanism and the burners may be started at suitable times and material may be supplied through the hopper 19 and the chute 20 to the upper compartment of the drying section, the arrangement being such that this material will fall on the hearth 12 near the center thereof. The rabbling mechanism will spread this material in a layer on the hearth 12 and gradually work it to the peripheral outlets 23 through which outlets the material will fall to the next hearth. As already described, the rabbling mechanism for successive hearths will work the material either towards central outlets or peripheral outlets and gradually carry it down to the lowermost hearth 18 from which the ash will be discharged through a chute 29. The burners 52 will serve to burn material in the burning section of the furnace and the hot gases of combustion thus produced will be used to dry the material in the drying section of the furnace. In the early stages of operation, a greater proportion of hot gases may be passed by the induced draft through the heat exchange tubes 48 to raise the temperature in the drying section more rapidly, the dampers 50 and 51 being adjusted accordingly. After the furnace has been properly started, it may be desirable in view of the temperature in the drying section to adjust the dampers 50 and 51 to by-pass more of the hot gases.

It should be understood that various changes may be made and that certain features may be used without others without departing from the true scope and spirit of the invention.

Having thus described my invention, I claim:

1. In apparatus of the class described, the combination with a multiple-hearth furnace having vertically spaced hearths with outlets through which material introduced at the top of the furnace may be passed from hearth to hearth to the lowermost hearth and then be discharged from the furnace, means at the outlet of one hearth for preventing the passage of gases and dividing the furnace into an upper drying section and a lower burning section, means for supplying air to the drying section and means for discharging hot combustion gases from the burning section and means for conducting air and vapor from the drying section into the burning section, of means for passing hot gases of combustion from the burning section upwardly in heat exchanging relation with the interior of said drying section.

2. In apparatus of the class described, the combination with a multiple-hearth furnace having vertically spaced hearths with outlets through which material introduced at the top of the furnace may be passed from hearth to hearth to the lowermost hearth and then be discharged from the furnace, means at the outlet of one hearth for preventing the passage of gases and dividing the furnace into an upper drying section and a lower burning section, means for supplying air to the drying section, a duct to discharge from the furnace hot gases in said burning section, and means for conducting air and vapor from the drying section into the burning section, of means for passing hot gases of combustion from the burning section upwardly in heat exchanging relation with the interior of said drying section, and means for varying the proportions of the hot gases of combustion brought into heat exchanging relationship with the interior of the drying section and the hot gases discharged directly from the furnace.

3. In apparatus of the class described, the combination with a multiple-hearth furnace having vertically spaced hearths with outlets through which material introduced at the top of the furnace may be passed from hearth to hearth to the lowermost hearth and then be discharged from the furnace, means at the outlet of one hearth for preventing the passage of gases and dividing the furnace into an upper drying section and a lower burning section, means for supplying air to the drying section, a duct to discharge from the furnace hot gases in said burning section, and means for conducting air and vapor from the drying section into the burning section, of means for passing hot gases of combustion from the burning section upwardly in heat exchanging relation with the interior of said drying section, means for varying the proportions of the hot gases of combustion brought into heat exchanging relationship with the interior of the drying section and the hot gases discharged directly from the furnace, and means for preheating the air for the drying section by heat exchange with the hot gases already used for heating the interior of the drying section.

4. In apparatus of the class described, the combination with a multiple-hearth furnace having vertically spaced hearths with outlets through which material introduced at the top of the furnace may be passed from hearth to hearth to the lowermost hearth and then be discharged from the furnace, means at the outlet of one hearth for preventing the passage of gases and dividing the furnace into an upper drying section and a lower burning section, means for supplying air to the drying section, a duct to discharge from the furnace hot gases in said burning section, and means for conducting air and vapor from the drying section into the burning section, of means for passing hot gases of combustion from the burning section upwardly in heat exchanging relation with the interior of said drying section, means for varying the proportions of the hot gases of combustion brought into heat exchanging relationship with the interior of the drying section and the hot gases discharged directly from the furnace, and means for preheating the air for the drying section by heat exchange with the hot gases discharged directly from the burning section.

5. In apparatus of the class described, the combination with a multiple-hearth furnace having vertically spaced hearths with outlets through which material introduced at the top of the furnace may be passed from hearth to hearth to the lowermost hearth and then be discharged from the furnace, means at the outlet of one hearth for preventing the passage of gases and dividing the furnace into an upper drying section and a lower burning section, means for supplying air to the drying section, a duct to discharge from the furnace hot gases in said burning section, and means for conducting air and vapor from the drying section into the burning section, of means for passing hot gases of combustion from the burning section upwardly in heat exchanging relation with the interior of said drying section, means for varying the proportions of the hot gases of combustion brought into heat exchanging relationship with the interior of the drying section and the hot gases discharged directly from the furnace, and means for preheating the air for the drying section by heat exchange with the hot gases discharged directly from the burning section and with the hot gases already used to heat the interior of the drying section.

6. In apparatus of the class described, the combination with a multiple-hearth furnace having a peripheral wall and vertically spaced hearths with outlets through which material introduced at the top of the furnace may pass from hearth to hearth to the lowermost hearth and then be discharged from the furnace, means at the outlet of one hearth for preventing the passage of gases and divide the furnace into an upper drying section and a lower burning section, means for supplying air to the drying section, means for discharging hot combustion gases from the part of the burning section and means for conducting air and vapor from the drying section into the lower part of said burning section, of means, including pipes extending from said burning section upwardly through the drying section at the inner surface of said peripheral wall, for passing hot gases of combustion from the upper part of the burning section upwardly in heat exchanging relation with the interior of said drying section.

7. In apparatus of the class described, the combination with a multiple-hearth furnace having a peripheral wall and vertically spaced hearths with outlets through which material introduced at the top of the furnace may pass from hearth to hearth to the lowermost hearth and then be discharged from the furnace, means at the outlet of one hearth for preventing the passage of gases and divide the furnace into an upper drying section and a lower burning section, means for supplying air to the drying section, means for discharging directly from the furnace hot combustion gases in the burning section and means for conducting air and vapor from the drying section into the lower part of said burning section, of heat exchange pipes extending from the burning section upwardly through the drying section, a manifold receiving hot gases from the upper ends of said heat exchange pipes, a heat exchanger heating the air for the drying section and receiving hot gases from the direct-discharge means and from the heat exchange pipes, and means for varying the relative amounts of hot gases from these two sources.

WILLIAM RAISCH.